US008855848B2

(12) United States Patent
Zeng

(10) Patent No.: US 8,855,848 B2
(45) Date of Patent: Oct. 7, 2014

(54) RADAR, LIDAR AND CAMERA ENHANCED METHODS FOR VEHICLE DYNAMICS ESTIMATION

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2244 days.

(21) Appl. No.: 11/758,180

(22) Filed: Jun. 5, 2007

(65) Prior Publication Data

US 2010/0017128 A1    Jan. 21, 2010

(51) Int. Cl.
*G05D 1/00* (2006.01)
*B60W 40/107* (2012.01)
*B60W 40/105* (2012.01)
*G01S 13/60* (2006.01)
*G01S 13/86* (2006.01)
*B60W 50/00* (2006.01)
*G01S 13/93* (2006.01)

(52) U.S. Cl.
CPC .......... *B60W 40/107* (2013.01); *B60W 40/105* (2013.01); *G01S 13/60* (2013.01); *G01S 13/865* (2013.01); *G01S 13/867* (2013.01); *B60W 2050/0033* (2013.01); *B60W 2420/52* (2013.01); *G01S 2013/9353* (2013.01)
USPC .............................................. 701/28; 701/70

(58) Field of Classification Search
USPC .......... 701/28, 41, 42, 70, 71, 74, 82, 90, 99, 701/110, 217, 220, 223, 300, 301, 302; 180/162
See application file for complete search history.

(56) References Cited

U.S. PATENT DOCUMENTS

| 5,229,944 | A | * | 7/1993 | Yasuno | 701/70 |
| 5,428,532 | A | * | 6/1995 | Yasuno | 701/48 |
| 5,648,905 | A | * | 7/1997 | Izumi et al. | 701/301 |
| 5,979,581 | A | * | 11/1999 | Ravani et al. | 180/168 |
| 5,986,601 | A | * | 11/1999 | Sugimoto | 342/70 |
| 6,128,569 | A | * | 10/2000 | Fukushima | 701/90 |
| 6,362,773 | B1 | * | 3/2002 | Pochmuller | 342/52 |
| 6,671,595 | B2 | * | 12/2003 | Lu et al. | 701/36 |
| 6,853,886 | B2 | * | 2/2005 | Mori | 701/1 |
| 6,940,448 | B2 | * | 9/2005 | Knoop et al. | 342/70 |
| 7,366,602 | B2 | * | 4/2008 | Xu et al. | 701/70 |
| 7,620,477 | B2 | * | 11/2009 | Bruemmer | 700/245 |
| 7,765,065 | B2 | * | 7/2010 | Stiller | 701/301 |
| 7,801,659 | B2 | * | 9/2010 | Leineweber et al. | 701/96 |
| 7,835,854 | B2 | * | 11/2010 | Yamamoto et al. | 701/117 |
| 2005/0004762 | A1 | * | 1/2005 | Takahama et al. | 701/301 |
| 2008/0082245 | A1 | * | 4/2008 | Fayyad et al. | 701/84 |
| 2008/0128546 | A1 | * | 6/2008 | Olsson et al. | 244/3.1 |
| 2008/0172156 | A1 | * | 7/2008 | Joh et al. | 701/45 |
| 2008/0234933 | A1 | * | 9/2008 | Chowdhary et al. | 701/213 |
| 2008/0319610 | A1 | * | 12/2008 | Oechsle et al. | 701/41 |

* cited by examiner

Primary Examiner — Thomas G Black
Assistant Examiner — Sze-Hon Kong
(74) Attorney, Agent, or Firm — John A. Miller; Miller IP Group, PLC

(57) ABSTRACT

A system for estimation vehicle dynamics, including vehicle position and velocity, using a stationary object. The system includes an object sensor that provides object signals of the stationary object. The system also includes in-vehicle sensors that provide signals representative of vehicle motion. The system also includes an association processor that receives the object signals, and provides object tracking through multiple frames of data. The system also includes a longitudinal state estimation processor that receives the object signals and the sensor signals, and provides a correction of the vehicle speed in a forward direction. The system also includes a lateral state estimation processor that receives the object signals and the sensor signals, and provides a correction of the vehicle speed in the lateral direction.

10 Claims, 2 Drawing Sheets

RADAR, LIDAR AND CAMERA ENHANCED METHODS FOR VEHICLE DYNAMICS ESTIMATION

BACKGROUND OF THE INVENTION

1. Field of the Invention

This invention relates generally to a system and method for determining vehicle dynamics and, more particularly, to a system and method for determining vehicle speed and position that employs radar, lidar and/or camera signals.

2. Discussion of the Related Art

Various driver assist systems and autonomous driving operations in vehicles, such as electronic stability control (ECS), adaptive cruise control (ACC), lane keeping (LK), lane changing (LC), etc., require the development of highly robust and precise modules for estimating various vehicle dynamics. Such modules are necessary to provide knowledge of the vehicle position and velocity to control the vehicle along a desired state.

Currently, micro-electromechanical system (MEMS) based inertial measurement units (IMUs) and wheel speed sensors are used to provide vehicle speed. However, the performance of wheel speed sensors is reduced during wheel slippage conditions, such as when the driver performs cornering and swerving maneuvers. Therefore, a dead-reckoning strategy for an IMU is utilized at these times to produce vehicle velocity and position of the vehicle. Because MEMS IMUs usually have larger errors than expensive gyro-systems, errors in position and velocity can grow rapidly. Thus, current automotive-grade MEMS IMUs alone are typically not suitable for dead-reckoning for a long period of time.

It has been proposed in the art to integrate GPS and a low cost MEMS IMU to address the non-zero bias and drift issues of an IMU. However, few of these systems address the issue that the GPS signals are not always available, such as when the vehicle is in "urban canyons" where an insufficient number of satellites are tracked to determine the position and the velocity of the vehicle.

Future advanced driver assist systems (ADS) for vehicles will include various object detection sensors, such as long-range radar and lidar sensors and ultrasonic parking aid sensors. Further, camera-based systems for lane departure warning are currently being developed. Thus, there has been an increased interest in utilizing data from these devices to estimate vehicle self-motion. For example, one system proposes to use an in-vehicle mounted calibrating camera to estimate self-motion and to detect moving objects on roads. Another proposed system uses a single camera for computing ego-motion of the vehicle based on optical flow. Further work includes the use of stereo-vision to the ego-pose estimation problem in urban environments. However, none of these approaches alone is reliable enough in cluttered scenes. Further, few of these systems make explicit the essential need for system integration that will be necessary in the future commercial development of this technology.

SUMMARY OF THE INVENTION

In accordance with the teachings of the present invention, a system and method are disclosed that estimates vehicle dynamics, including vehicle position and velocity, using a stationary object. The system includes an object sensor, such as a radar, lidar or camera, that provides object signals of the stationary object. The system also includes in-vehicle sensors that provide signals representative of vehicle motion, such as steering wheel angle, yaw-rate, longitudinal speed, longitudinal acceleration and lateral acceleration. The system also includes an association processor that receives the object signals, and provides object tracking through multiple frames of data. The system also includes a longitudinal state estimation processor that receives the object signals and the sensor signals, and provides a correction of the vehicle speed in a forward direction. The system also includes a lateral state estimation processor that receives the object signals and the sensor signals, and provides a correction of the vehicle speed in a lateral direction.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for estimating vehicle dynamics using radar, lidar and/or camera signals is merely exemplary in nature, and is in no way intended to limit the invention or its applications or uses.

As will be discussed in detail below, the present invention proposes an integrated system using low-cost MEMS IMUs and other in-vehicle dynamic sensors to correct vehicle dynamics estimations in real-time using supporting sensors, such as radar, lidar, vision systems or combinations thereof. This will allow either improved performance from existing sensors or the same performance from smaller and cheaper sensors.

Figure 1:
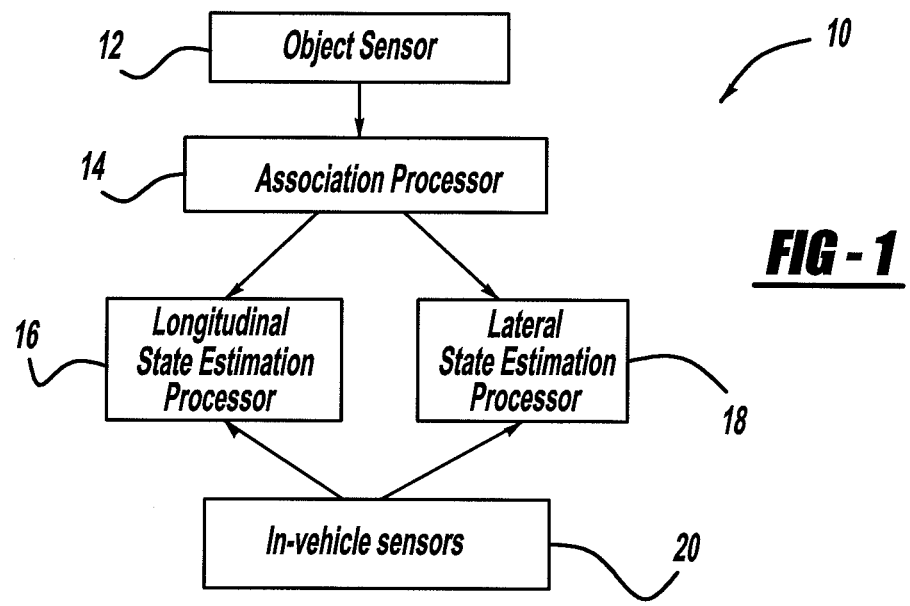
FIG. 1 is a block diagram of a system for determining vehicle state estimations using object sensors, according to an embodiment of the present invention.

FIG. 1 is a block diagram of a system 10 that provides vehicle state estimations, such as vehicle position and velocity, according to an embodiment of the present invention. The system 10 includes one or more object sensors 12, such as radar, lidar, vision systems, cameras, etc., that may be available on the vehicle to provide signals that track objects external to the vehicle. The signals from the sensors 12 are sent to an association processor 14 that matches the maps or images from the signals from consecutive views to track the objects. The tracks from the association processor 14 are sent to a longitudinal state estimation processor 16 that estimates vehicle speed in a forward direction and a lateral state estimation processor 18 that estimates vehicle speed in a lateral direction as a result of yaw-rate and side-slip angle. The processors 16 and 18 also receive signals from in-vehicle sensors 20, such as a steering wheel angle sensor, a yaw-rate sensor, a longitudinal speed sensor, a longitudinal acceleration sensor, a lateral acceleration sensor, etc., all of which are well-known to those skilled in the art as part of the various vehicle stability control and driver assist systems referred to above.

Figure 2:
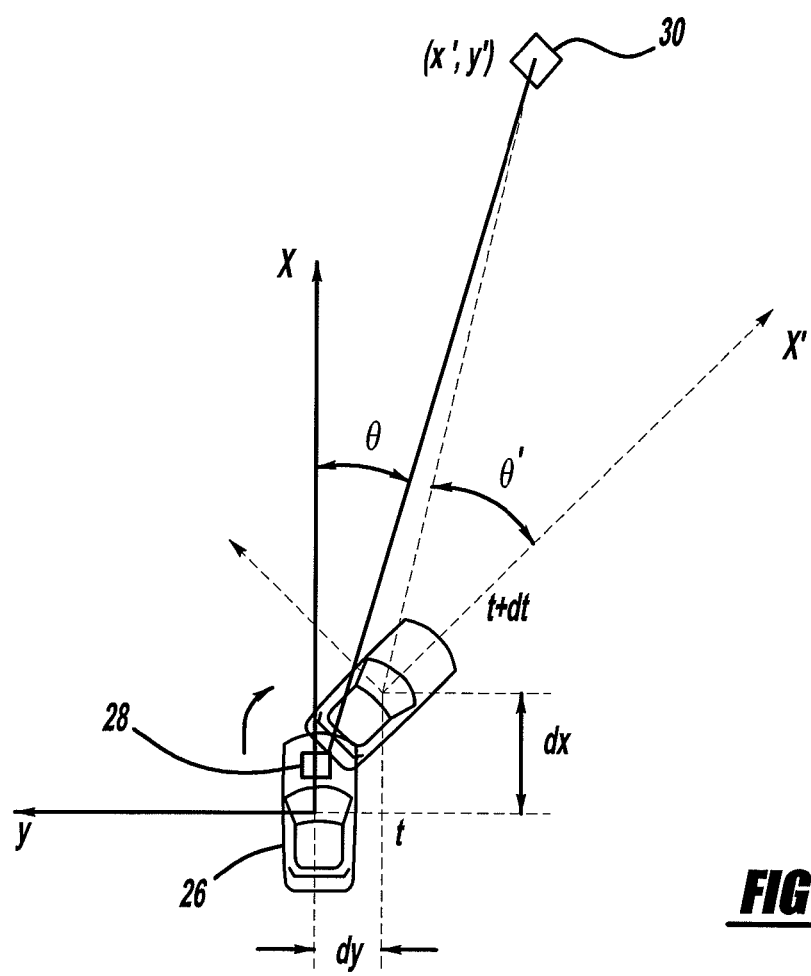
FIG. 2 is a plan view showing vehicle ego-motion from stationary radar tracks.

The object sensors 12 determine the ego-motion of the vehicle from the measurement of stationary objects. FIG. 2 is a plan view of a vehicle 26 including a radar sensor 28 that is tracking a stationary object 30, such as a tree. The radar sensor 28 is mounted at the center of gravity (CG) of the vehicle frame and is directed along the direction of the vehicle travel. From the radar signals, vehicle velocities can be calculated as:

$$v_x = -(x'-x)/\Delta T \quad (1)$$

$$v_y = -(y'-y)/\Delta T \quad (2)$$

$$r = -(\Theta'-\Theta)/\Delta T \quad (3)$$

Where the quantities (x,y) and (x',y') are the positions of the stationary object 30 at time t and t+Δt, respectively, and $v_x, v_y$ and r are the longitudinal velocity, lateral velocity and yaw-rate, respectively, of the vehicle 26.

Figure 3:
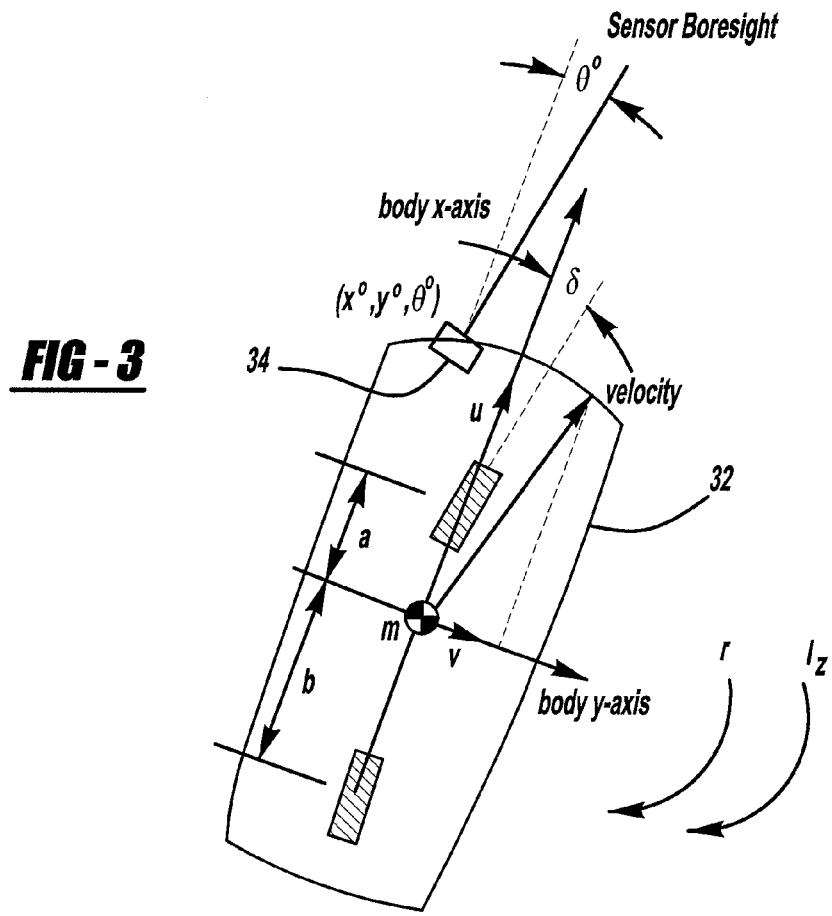
FIG. 3 is an illustration of a bicycle model identifying parameters for vehicle handling.

The range calculations referred to above can be extended using a bicycle model of a vehicle 32, shown in FIG. 3, to provide position tracking in the association processor 14. A range sensor 34 is mounted at position $(x^0, y^0, \theta^0)$ on the vehicle, and points in a forward direction. The notations for the bicycle model are given as:

a: Distance from the font wheel axis to the vehicle center of gravity (CG);
b: Distance from the rear wheel axis to the vehicle CG;
m: Vehicle mass;
$I_z$: Vehicle inertia mass along the z-axis;
δ: Front road wheel angle;
I: Vehicle yaw-rate;
u: Vehicle longitudinal velocity; and
υ: Vehicle lateral velocity.

The radar output is a list of objects $\{o_i|i=1,\ldots,K\}$ at time t. The measurement of the i-th object $o_i$ contains range ρ, range rate ρ̇ and azimuth angle Θ. Usually the field-of-view of a long-range radar is narrow, for example, 15°, therefore each detected object lies in front of the vehicle in the x-axis. Equation (4) below can be used to determine if the object is stationary.

$$|\dot{r}\cos\Theta - v_x| < T \quad (4)$$

The vehicle dynamics can be represented by a state vector z whose components include:

$δa_x$: Correction of the longitudinal acceleration measurement;
$v_x$: Vehicle longitudinal velocity;
$δ_r$: Correction of the yaw rate measurement;
$v_y$: Vehicle lateral velocity; and
$\{(x_i,y_i)|i=1,\ldots,K\}$: List of positions of stationary objects.

The longitudinal state estimation processor 16 receives longitudinal position, longitudinal speed, longitudinal acceleration and vehicle speed signals from the sensors, and uses Kalman filtering and an auto-regression noise model to provide a corrected longitudinal acceleration $a_{xo}$, a corrected longitudinal velocity $v_{xo}$ and wheel slippage of the vehicle. The sensors 20, such as the accelerometers and wheel sensors, give measurements of the longitudinal acceleration $a_{xo}$ and the velocity $v_{xo}$ of the vehicle. The estimation processor 16 may receive longitudinal position and longitudinal speed of the vehicle from the radar input and longitudinal acceleration and vehicle speed from the in-vehicle sensors 20.

The processor 16 considers the acceleration correction as a random walk process. The longitudinal system of the vehicle can be written as:

$$x_i(t+1) = x_i(t) - \Delta T v_x(t) - \frac{\Delta T^2}{2}(a_{xo}(t)+\delta a_x(t)) - \frac{\Delta T^2}{2}\in \quad (5)$$

$$v_x(t+1) = v_x(t) + \Delta T(a_{xo}(t)+\delta a_x(t)) + \Delta T \in \quad (6)$$

$$\delta a_x(t+1) = \delta a_x(t) + \in \quad (7)$$

Where ∈ is a zero-mean white random process with a Gaussian distribution.

Given a measurement of $o_i=(p_i,\dot{p}_i,\Theta_i)$ from the i-th object, the observation equation can be written as:

$$p_i \cos\Theta_i = x_i + v_1 \quad (8)$$

$$\dot{p}_i \cos\Theta_i = -v_x + v_2 \quad (9)$$

$$v_{xo} = v_x + v_3 \quad (10)$$

Where the quantities $v_1$, $v_2$ and $v_3$ are observation noises that are modeled as Guassian white random processes.

The Kalman filtering process in the processor 16 is used to determine the corrected longitudinal acceleration $a_x+\delta a_x$, the corrected longitudinal velocity $v_x$ and wheel slippage if the following condition is satisfied.

$$|v_x - v_{xo}| > T \quad (11)$$

Where T is a threshold.

The lateral state estimation processor 18 receives an object azimuth angle, object lateral offset, steering wheel angle, yaw-rate and lateral acceleration signals from the sensors, and uses Kalman filtering and an auto-regression noise model to provide a yaw-rate correction, a lateral acceleration correction and a lateral velocity signal of the vehicle. The in-vehicle sensors 20, such as the accelerometer and yaw-rate sensors, give measurements of lateral acceleration $a_{yo}$ and yaw-rate $r_o$ of the vehicle. The steering wheel angle sensor gives the steering wheel angle $\delta_f$. The correction of the yaw-rate is modeled as a random walk. By letting L=a+b be the wheel-base and $c_f$ and $c_r$ be the cornering stiffness coefficients of the front and rear tires, the lateral plant model can be written as:

$$y_i(t+1) = y_i(t) - \Delta T((r_o+\delta r(t))x_i + v_y(t)) - \Delta T x_i \in_1 -\Delta T \in_2 \quad (12)$$

$$v_y(t+1) = \left(1-\Delta T\frac{c_f+c_r}{mv_x}\right)v_y(t) + \Delta T\left(\frac{c_rb-c_fb}{mv_x}\right)(r_o+\delta r(t)) + \Delta T\frac{c_f}{m}\delta_f + \in_2 \quad (13)$$

$$\delta r(t+1) = \Delta T\frac{-ac_f+bc_r}{I_z v_x}v_y(t) - \Delta T\frac{a^2c_f+b^2c_r}{I_z v_x}(r_o+\delta r(t)) + \in_1 \quad (14)$$

Where $\in_1$ and $\in_2$ are two white Gaussian random processes.

Given a measurement of $o_i=(p_i,\dot{p}_i,\Theta_i)$ from the i-th object, the observation equation can be written as:

$$p_i \sin\Theta_i = y_i + v_1 \quad (15)$$

$$a_{yo} = v_x(r_o+\delta_r) + v_2 \quad (16)$$

Where the quantities $v_1$ and $v_2$ are observation noises that are modeled as Gaussian white random processes. Here $v_1$ is the error introduced by the measurement and $v_2$ is the error introduced by banked road or sensor measurements.

The Kalman filter in the lateral estimation processor 18 is used to determine the corrected yaw-rate $(r_o+\delta r)$, the corrected lateral acceleration $(a_y+\delta a_y)$, and the lateral velocity $v_y$.

Most range sensors used in the art report an object with an identifier that remains the same across different time frames. This information is used to match object maps from consecutive frames. Mathematically, it can be assumed that the sensor gives the object map $\{o_i(t)l_i(t)|i=1,\ldots,K_1\}$ at time i and map $\{o_j(t'),l_j(t')|j=1,\ldots,K_{t'}\}$ at time t', where l denotes the object identifier. Therefore, the matches of consecutive maps can be defined as:

$$\{(o_i(t),o'_j(t'))|l_i(t)=l_j(t'), 1\le i\le K_t, 1\le j\le k_{t'}\} \quad (17)$$

In one embodiment, a monocular camera can be used as the object sensor. The camera recovers motion of the vehicle navigating on the ground surface by tracking certain scene elements on the ground. In a monocular sequence, a nomography transformation exists between two views for the elements on the same plane. That is, for a set of point correspondences $x_i, x'_i$ between two images, assuming that the points are coplanar, there is a homography matrix F defined as;

$$x'_i = F x_i \quad (18)$$

Where x denotes a homogeneous image coordinate $(u, \upsilon, m)^T$, which represents the image pixel at $$\left(\frac{u}{m}, \frac{\upsilon}{m}\right).$$

Figure 4:
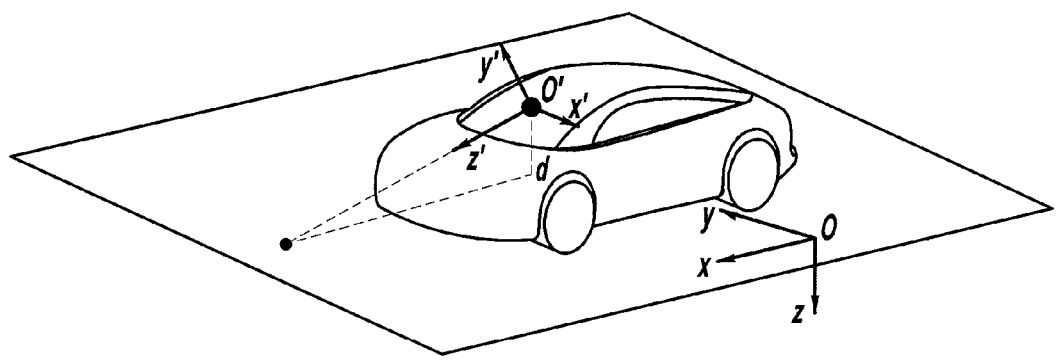
FIG. 4 is a plan view of a vehicle coordinate system.

A world coordinate at time t is defined so that the plane x-o-y are coincident to the ground plane, as shown in FIG. 4. The camera coordinate system o'x'y'z' is fixed with the camera whose image plane and symmetric axis are coincident to the plane o'x'y' and z'-axis, respectively. By letting the camera's projection matrices of two views be P=K[I|0] and P'=K[Rc], respectively, the homography matrix F can be given as:

$$F = K(R - c n^T / d) K^{-1} \quad (19)$$

Where K is the intrinsic matrix, R is the camera rotation matrix, c is the camera center coordinates and $\pi = (n^T, d)^T$ is the plane equation $(n^T X + d = 0)$, all in world coordinate system.

In FIG. 4, let P denote the project matrix at time t be P=KR[I|−c], where c=(x,y,−d)' and R are the camera's extrinsic matrix. The ground plane is denoted as $\pi_0 = (n_0^T, 0)^T$ where $n_0 = (0, 0, 1)^T$. For the view of the next frame t', the vehicle translates $\Delta c = (\Delta_x, \Delta_y, 0)^T$ and rotates $\Delta \theta$ on the ground plane. The rotation matrix can be written as:

$$\Delta R = \begin{pmatrix} \cos\Delta\theta & \sin\Delta\theta & 0 \\ -\sin\Delta\theta & \cos\Delta\theta & 0 \\ 0 & 0 & 0 \end{pmatrix} \quad (20)$$

Then, the projection matrix P' at time t' can be written as P'=KR'[I|−c'], where R'=RΔR, and c'=c+Δc.

To apply equation (19), the world coordinate system is moved to the camera center at time t. The new projection matrices become:

$$P = K[I|0] \quad (21)$$

$$P' = K[R'R^{-1}| -R'\Delta c] \quad (22)$$

The ground plane becomes $(R n_0, d)$. Thus:

$$F = K(R'R^{-1} + R'\Delta c n_0^T R R^T / d) K^{-1} \quad (23)$$

Applying $R^T = R^{-1}$ and R'=RΔR gives:

$$F = K R \Delta R (I + \Delta c n_0^T / d)(KR)^{-1} \quad (24)$$

If the calibrated camera is considered, i.e., K and R are known in advance, the essential matrix E can be computed as:

$$E = (KR)^{-1} F K R = \Delta R (I + \Delta c n_0^T / d) \quad (25)$$

With $n = (0, 0, 1)^T$, $\Delta c = (\Delta x, \Delta y, 0)^T$ and equation (20), the essential matrix E can be written as:

$$E = \begin{pmatrix} \cos\Delta\theta & \sin\Delta\theta & \frac{\Delta x}{d}\cos\Delta\theta + \frac{\Delta y}{d}\sin\Delta\theta \\ -\sin\Delta\theta & \cos\Delta\theta & -\frac{\Delta x}{d}\sin\Delta\theta + \frac{\Delta y}{d}\cos\Delta\theta \\ 0 & 0 & 1 \end{pmatrix} \quad (26)$$

Usually the rotation angle θ is small (i.e., sin θ<<1) with two consecutive views. Thus, equation (26) can be approximated as:

$$E \approx \begin{bmatrix} \cos\Delta\theta & \sin\Delta\theta & \frac{\Delta x}{d} \\ -\sin\Delta\theta & \cos\Delta\theta & \frac{\Delta y}{d} \\ 0 & 0 & 1 \end{bmatrix} \quad (27)$$

The essential matrix E in equation (27) is actually a two-dimensional transformation having a translation $\Delta x/d, \Delta y/d$ and a rotation θ.

Given a set of matched feature point pairs $\{(x_i, x'_i) | i = 1, \ldots, N)\}$, the self-motion estimation can be formulated as a least square estimation:

$$\underset{F}{\arg\min} \frac{1}{N} \sum_{i=1}^{N} \|x'_i - F x_i\| \quad (28)$$

Which can be transformed into:

$$\underset{E}{\arg\min} \frac{1}{N} \sum_{i=1}^{N} \|\hat{x}'_i - E \hat{x}_i\| \quad (29)$$

Where $\hat{x} = KRx$ and $\hat{x}' = KRx'$ if the camera's calibration matrices K and R are known.

Examining equation (27), the normalized points between the two views are related to each other with a rigid rotation (Δθ) and translation (Δx/d,Δy/d). The following method can be utilized to recover the parameters.

The input is N pairs of the matched ground feature points $\{(x_i, x'_i) | i = 1, \ldots, N\}$ and the camera's intrinsic and extrinsic parametric matrices K and R.

The output is the estimated self-motion parameters $c_2 = (\Delta x/d, \Delta y/d)$ and $$R_2 = \begin{pmatrix} \cos\Delta\theta & -\sin\Delta\theta \\ \sin\Delta\theta & \cos\Delta\theta \end{pmatrix}.$$

1. For all $x_i$ and $x'_i$, calculate $\hat{x}_i = KRxi$ and $\hat{x}'_i = KRx'_i$.

2. Compute $$\bar{x} = \frac{1}{N} \sum_{i=1}^{N} \hat{x}_i \text{ and } \bar{x}' = \frac{1}{N} \sum_{i=1}^{N} \hat{x}'_i.$$

3. Compute:

$$C = \frac{1}{N}\sum_{i=1}^{N}(\hat{x}_i - \bar{x})(\hat{x}_i - \bar{x})^T \quad (30)$$

4. Let the singular value composition of the matrix C be written as $C=UWV^T$

Then, the rotation $R_2$ and the translation $t_2$ can be solved as:

$$R_2 = U\begin{pmatrix} 1 & 0 \\ 0 & \det(UV^T) \end{pmatrix}V^T \quad (31)$$

$$t_2 = \bar{x}' - R_2\bar{x} \quad (32)$$

A Harris corner detector can be used to detect the feature points in the two consecutive images. Then, a correlation operation of the images is conducted to find the matching between the found feature points. The image point at $(u,\upsilon)$ in image I and the image point at $(u',\upsilon')$ in image I' is matched if, and only if, the following conditions are satisfied:

$$\sqrt{(u-u')^2 + (\upsilon-\upsilon')^2} < T_1 \quad (33)$$

$$\frac{1}{K^2}\sum_{i=u-K}^{u+K}\sum_{j=\upsilon-K}^{\upsilon+K}|I(i,j) - I'(i,j)| < T_2 \quad (34)$$

The estimated motion parameters in the previous cycle are used to guide the matching process. The following outliers deletion method is used to reject scene elements above the ground or from dynamic moving objects, such as vehicles in the road.

The input is two sets of the scene elements (normalized with intrinsic and extrinsic matrices) in pixel coordinates, denoted by $\{(\hat{u}_i,\hat{\upsilon}_i)|i=1,\ldots,N\}$ and $\{(\hat{u}'_j,\hat{\upsilon}'_j)|j=1,\ldots,M\}$.

The output is matched point pairs and estimated motion parameters.

1. Predict the location of the elements in the previous frame by using previous motion parameters:

$$-\begin{pmatrix} \tilde{u}_i \\ \tilde{u}_i \end{pmatrix} = R_2\begin{pmatrix} \hat{u}_i \\ \hat{u}_i \end{pmatrix} + t_2.$$

2. Use the correlation method to match the sets of the predicted points $\{(\hat{u}_i,\hat{\upsilon}_i)\}$ and $\{(\hat{u}'_j,\hat{\upsilon}'_j)\}$.

3. Randomly pick no less than four matched pairs that are not co-linear, and then derive the self-motion parameters using the method discussed above.

4. Validate the derived motion parameters by using the matched pairs from step 3.

5. If the error of the majority of the matched points are sufficiently small, exit the process, otherwise, go to step 3.

Similarly as the range sensor described above, the ego-motion across multiple frames can be estimated by tracking. The plant and observation models can be written as follows.

The state of motion is denoted by:
- $\upsilon_x$: Vehicle longitudinal velocity;
- $\upsilon_y$: Vehicle lateral velocity;
- $\delta r$: rate measurement correction; and
- $\delta a_x$: Longitudinal acceleration correction.

Let $\upsilon_{xo}, a_{xo}, r_o$, and $a_{yo}$ denote measured longitudinal speed, longitudinal acceleration, yaw rate and lateral acceleration, respectively. Then, the plant model can be written as:

$$\delta a_x(t+1) = \delta a_x(t) + \in_1 \quad (35)$$

$$\upsilon_x(t+1) = \upsilon_x(t) + \Delta T(\delta a_x(t) + a_{xo}) + \Delta T \in_1 \quad (36)$$

$$\delta r(t+1) = \Delta T\frac{-ac_f + bc_r}{I_z\upsilon_x}\upsilon_y(t) - \Delta T\frac{-a^2c_f + b^2cr}{I_z\upsilon_x}(r_o + \delta_r(t)) + \in_2 \quad (37)$$

$$\upsilon_y(t+1) = \left(1 - \Delta T\frac{c_f + c_r}{m\upsilon_x}\right)\upsilon_y(t) + \Delta T\left(\frac{c_rb - c_fb}{m\upsilon_x} - \upsilon_x\right)(r_o + \delta r(t)) + \Delta T\frac{c_f}{m}\delta_f + \in_3 \quad (38)$$

Where $\in_1, \in_2$ and $\in_3$ are zero-mean Gaussian white noise.

Let the motion parameters recovered from two consecutive views be denoted by $(\Delta\theta_o(t), \Delta x_o(t), \Delta y_o(t))$, where $\Delta\theta_o$ is the rotation angle and $(\Delta x_o, \Delta y_o)$ is the translation. The observation equations can be written as:

$$\Delta x_o = \upsilon_x\Delta T + v_1 \quad (39)$$

$$\Delta y_o = \upsilon_y\Delta T + v_2 \quad (40)$$

$$\Delta\theta_o = (r_o + \delta r)\Delta T + v_3 \quad (41)$$

$$a_{yo} = \upsilon_x(r_o + \delta r) + v_4 \quad (42)$$

Where $v_1, v_2, v_3$, and $v_4$ are the noises introduced by the measurements, usually modified as white zero-mean Gaussian random processes.

Thus, the Kalman filter can be used to determine the state variables.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for estimating vehicle dynamics in a vehicle, said system comprising:
   an object detection sensor for detecting stationary objects relative to vehicle motion, said object detection sensor providing object detection signals for tracking the objects;
   a plurality of in-vehicle sensors providing sensor signals representative of the vehicle motion, said plurality of in-vehicle sensors includes steering wheel angle sensors, yaw-rate sensors, longitudinal speed sensors, longitudinal acceleration sensors and lateral acceleration sensors;
   an association processor responsive to the object detection signals, said association processor matching the object detection signals of consecutive views to track the objects, and providing object tracking signals;
   a longitudinal state estimation processor responsive to the object tracking signals and the sensor signals, and providing an estimation of vehicle speed in a forward direction relative to the vehicle motion; and
   a lateral state estimation processor responsive to the object tracking signals and the sensor signals, said lateral state estimation processor estimating vehicle speed in a lateral direction relative to the vehicle motion, wherein the object detection sensor is a monocular camera.

2. The system according to claim 1 wherein the object detection sensor detects the position of the object by employing a bicycle model.

3. The system according to claim 1 wherein the longitudinal state estimation processor and the lateral state estimation processor employ Kalman filters for determining the longitudinal and lateral speed of the vehicle.

4. The system according to claim 3 wherein the longitudinal state estimation processor receives object and sensor signals of the vehicle longitudinal position, the vehicle longitudinal speed, the vehicle longitudinal acceleration and vehicle speed, and uses the Kalman filter and an auto-regression noise model to provide a corrected longitudinal acceleration, a corrected vehicle speed and a wheel slippage signal.

5. The system according to claim 3 wherein the lateral state estimation processor receives object and sensor signals of azimuth angle and lateral offset of an object and steering wheel angle, yaw-rate and lateral acceleration of the vehicle, and uses the Kalman filter and an auto-regression noise model to provide a yaw-rate correction, a lateral acceleration correction and a lateral velocity of the vehicle.

6. The system according to claim 1 wherein the system is part of a micro-electromechanical system based inertia measurement unit.

7. A method for estimating vehicle dynamics of a vehicle, said method comprising:
  detecting stationary objects relative to the motion of the vehicle and providing object detection signals;
  measuring various vehicle states using in-vehicle sensors and providing sensor signals;
  using the object detection signals and the sensor signals to provide a corrected longitudinal acceleration and vehicle speed of the vehicle; and
  using the object detection signals and the sensor signals to provide a corrected lateral acceleration and yaw-rate of the vehicle, wherein measuring the various vehicle states using in-vehicle sensors includes using steering wheel angle sensors, yaw-rate sensors, longitudinal speed sensors, longitudinal acceleration sensors and lateral acceleration sensors.

8. The method according to claim 7 wherein detecting stationary objects includes using a radar device, a lidar device and/or a camera device.

9. The method according to claim 7 wherein providing a corrected longitudinal acceleration and vehicle speed includes receiving the object detection signals and the sensor signals that identify vehicle longitudinal position, vehicle longitudinal speed, vehicle longitudinal acceleration and vehicle speed, and using a Kalman filter and an auto-regression noise model to provide the corrected longitudinal acceleration, vehicle speed and wheel slippage.

10. The method according to claim 7 wherein providing a corrected lateral acceleration and yaw-rate includes using the object detection signals that identify object azimuth angle and object lateral offset and the sensor signals that identify steering wheel angle, yaw-rate and lateral acceleration, and using a Kalman filter and an auto-regression noise model to provide the lateral acceleration correction, a lateral velocity correction and the yaw rate.

* * * * *